US011145050B2

(12) United States Patent
Inoue et al.

(10) Patent No.: US 11,145,050 B2
(45) Date of Patent: Oct. 12, 2021

(54) PATTERN INSPECTION APPARATUS AND PATTERN INSPECTION METHOD

(71) Applicant: NuFlare Technology, Inc., Yokohama (JP)

(72) Inventors: Takafumi Inoue, Chigasaki (JP); Kazuhiro Nakashima, Kawasaki (JP); Manabu Isobe, Hiratsuka (JP); Hiroteru Akiyama, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 34 days.

(21) Appl. No.: 16/654,243

(22) Filed: Oct. 16, 2019

(65) Prior Publication Data

US 2020/0160496 A1 May 21, 2020

(30) Foreign Application Priority Data

Nov. 15, 2018 (JP) .............................. JP2018-214574

(51) Int. Cl.
*G06T 7/00* (2017.01)
*G06T 7/11* (2017.01)

(52) U.S. Cl.
CPC ............... *G06T 7/001* (2013.01); *G06T 7/11* (2017.01); *G06T 2207/30148* (2013.01)

(58) Field of Classification Search
CPC . G06T 7/001; G06T 7/11; G06T 2207/30148; H01L 22/12; H01L 22/24
See application file for complete search history.

(56) References Cited

U.S. PATENT DOCUMENTS

2004/0126003 A1* 7/2004 Isomura .................. G06T 7/001
 382/141
2017/0122890 A1* 5/2017 Inoue ...................... H01J 37/28
(Continued)

FOREIGN PATENT DOCUMENTS

JP 3641229 B2 4/2005
JP 2005-134347 A 5/2005
(Continued)

OTHER PUBLICATIONS

Combined Taiwanese Office Action and Search Report dated Jan. 25, 2021 in Patent Application No. 108135989 (with English machine translation), citing document AO therein, 7 pages.

*Primary Examiner* — Ping Y Hsieh
(74) *Attorney, Agent, or Firm* — Oblon, McClelland, Maier & Neustadt, L.L.P.

(57) ABSTRACT

A pattern inspection apparatus includes an optical image acquisition mechanism to acquire optical image data of a plurality of regions from a substrate where a plurality of figure patterns are formed, a plurality of comparison circuits each of which performs one of die-to-die inspection processing for comparing the optical image data with each other and die-to-database inspection processing for comparing the optical image data with reference image data generated from design pattern data, and an inspection circuit to individually output, for each region of the plurality of regions, the optical image data of a region concerned to comparison circuits, whose number is variably set for each region, in the plurality of comparison circuits, and to control each comparison circuit, serving as an output destination of the optical image data in the plurality of comparison circuits, to perform one of the die-to-die inspection processing and the die-to-database inspection processing.

10 Claims, 10 Drawing Sheets

(56) References Cited

U.S. PATENT DOCUMENTS

| | | | |
|---|---|---|---|
| 2019/0066286 A1* | 2/2019 | Shiratsuchi | G06T 5/002 |
| 2019/0086340 A1* | 3/2019 | Leu | H01L 22/20 |
| 2019/0206047 A1* | 7/2019 | Honda | G01N 21/9501 |

FOREIGN PATENT DOCUMENTS

| JP | 3645547 B2 | 5/2005 |
|---|---|---|
| TW | 201539906 A | 10/2015 |

* cited by examiner

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2018-214574 filed on Nov. 15, 2018 in Japan, the entire contents of which are incorporated herein by reference.

BACKGROUND OF THE INVENTION

Field of the Invention

Embodiments of the present invention relate to a pattern inspection apparatus and a pattern inspection method. For example, embodiments of the present invention relate to a pattern inspection technique for inspecting defects of patterns on an object serving as a target workpiece or "sample" used in manufacturing semiconductor devices, and to an inspection method for inspecting defects of minute patterns formed on a photomask, wafer, liquid crystal substrate or the like used in manufacturing semiconductor devices/elements or liquid crystal displays (LCDs).

Description of Related Art

In recent years, with the advance of high integration and large capacity of large scale integrated circuits (LSI), the line width (critical dimension) required for circuits of semiconductor elements is becoming progressively narrower. Such semiconductor elements are manufactured through circuit formation by exposing and transferring a pattern onto a wafer by means of a reduced projection exposure apparatus known as a stepper while using an original or "master" pattern (also called a mask or a reticle, hereinafter generically referred to as a mask) with a circuit pattern formed thereon. Then, in fabricating a mask used for transfer printing such a fine circuit pattern onto a wafer, a pattern writing apparatus capable of writing or "drawing" fine circuit patterns by using electron beams needs to be employed. Pattern circuits may be written directly on the wafer by the pattern writing apparatus. Also, a laser beam writing apparatus that uses laser beams in place of electron beams for writing a pattern is under development.

Since LSI manufacturing requires a tremendous amount of manufacturing cost, it is crucial to improve its yield. As typified by a 1-gigabit DRAM (Dynamic Random Access Memory), the scale of patterns configuring an LSI is in transition from on the order of sub-microns to on the order of nanometers. One of major factors that decrease the yield of the LSI manufacturing is due to pattern defects on the mask used for exposing/transferring an ultrafine pattern onto a semiconductor wafer by the photolithography technology. In recent years, with miniaturization of dimensions of LSI patterns formed on a semiconductor wafer, dimensions to be detected as a pattern defect have become extremely small. Therefore, the pattern inspection apparatus for inspecting defects on a transfer mask used in manufacturing LSI needs to be highly accurate.

As an inspection method, there is known a method of comparing an optical image obtained, using a magnification optical system, by imaging a pattern formed on a target object or "sample" such as a lithography mask at a predetermined magnification, with design data or with another optical image obtained by imaging the same pattern on the target object. For example, as a pattern inspection method, there are "die-to-die inspection" and "die-to-database inspection". The "die-to-die inspection" method compares data of optical images of identical patterns at different positions on the same mask. The "die-to-database inspection" method inputs, into an inspection apparatus, writing data (design data) generated by converting pattern-designed CAD data to a writing apparatus specific format to be input to the writing apparatus when a pattern is written on the mask, generates a design image (reference image) based on the input writing data, and compares the generated design image with an optical image being measured target data obtained by imaging the pattern. In such inspection methods for use in the inspection apparatus, a target object is placed on the stage so that a light flux may scan the target object as the stage moves in order to perform an inspection. Specifically, the target object is irradiated with a light flux from the light source through the illumination optical system. Light transmitted through the target object or reflected therefrom forms an image on a sensor through the optical system. The image acquired by the sensor is transmitted as measured target data to the comparison circuit. After performing alignment between images, the comparison circuit compares the measured target data with reference data according to an appropriate algorithm, and determines that there is a pattern defect if the compared result is not within an allowable range.

The die-to-die (DD) inspection and the die-to-database (DB) inspection described above operate independently. Therefore, in the case of inspecting one substrate, if the region to be inspected by the die-to-die method and the region to be inspected by the die-to-database method are intermingled, it is conventionally necessary to take the trouble of performing inspections twice. Accordingly, in conducting both the inspections, two scanning operations and two setup operations are needed, which generates a problem that the inspection time will be prolonged.

There is disclosed a technique (e.g., refer to Japanese Patent Application Laid-Open (JP-A) No. 2005-134347) in which a plurality of inspection comparing units capable of performing both the die-to-die inspection and the die-to-database inspection are arranged to first conduct a die-to-database inspection, for image data obtained by one imaging, in one of the plurality of inspection comparison units, and when determined there is no defect, it is concluded that the image data is fine. Next, a die-to-die inspection is conducted, in the same inspection comparison unit, between the fine image data and another image data. After this die-to-die inspection, if determined there is a defect, it is concluded that the another image data has defect. However, this technique is just searching, by a die-to-database inspection, a master die to be used in a die-to-die inspection.

BRIEF SUMMARY OF THE INVENTION

According to one aspect of the present invention, a pattern inspection apparatus includes an optical image acquisition mechanism configured to acquire optical image data of a plurality of regions from a substrate where a plurality of figure patterns are formed, a plurality of comparison circuits each configured to perform one of die-to-die inspection processing which compares the optical image data with each other and die-to-database inspection processing which compares the optical image data with reference image data generated from design pattern data, and an inspection circuit configured, for each region of the plurality of regions, to individually output the optical image data of a region concerned to comparison circuits, whose number is variably set for the each region, in the plurality of comparison circuits, and to control each comparison circuit, serving as an output destination of the optical image data in the plurality of comparison circuits, to perform one of the die-to-die inspection processing and the die-to-database inspection processing.

According to another aspect of the present invention, a pattern inspection method includes acquiring optical image data of a plurality of regions from a substrate where a plurality of figure patterns are formed, outputting, for each region of the plurality of regions, the optical image data of a region concerned to comparison circuits, whose number is variably set for the each region, in a plurality of comparison circuits each of which performs one of die-to-die inspection processing that compares the optical image data with each other and die-to-database inspection processing that compares the optical image data with reference image data generated from design pattern data, and performing one of the die-to-die inspection processing and the die-to-database inspection processing for the optical image data of the region concerned by each comparison circuit serving as an output destination of the optical image data in the plurality of comparison circuits, and outputting an inspection result.

DETAILED DESCRIPTION OF THE INVENTION

Embodiments below describe an inspection apparatus and method capable of efficiently performing inspection processing even if a region to be inspected by the die-to-die method and a region to be inspected by the die-to-database method are intermingled.

First Embodiment

Figure 1:
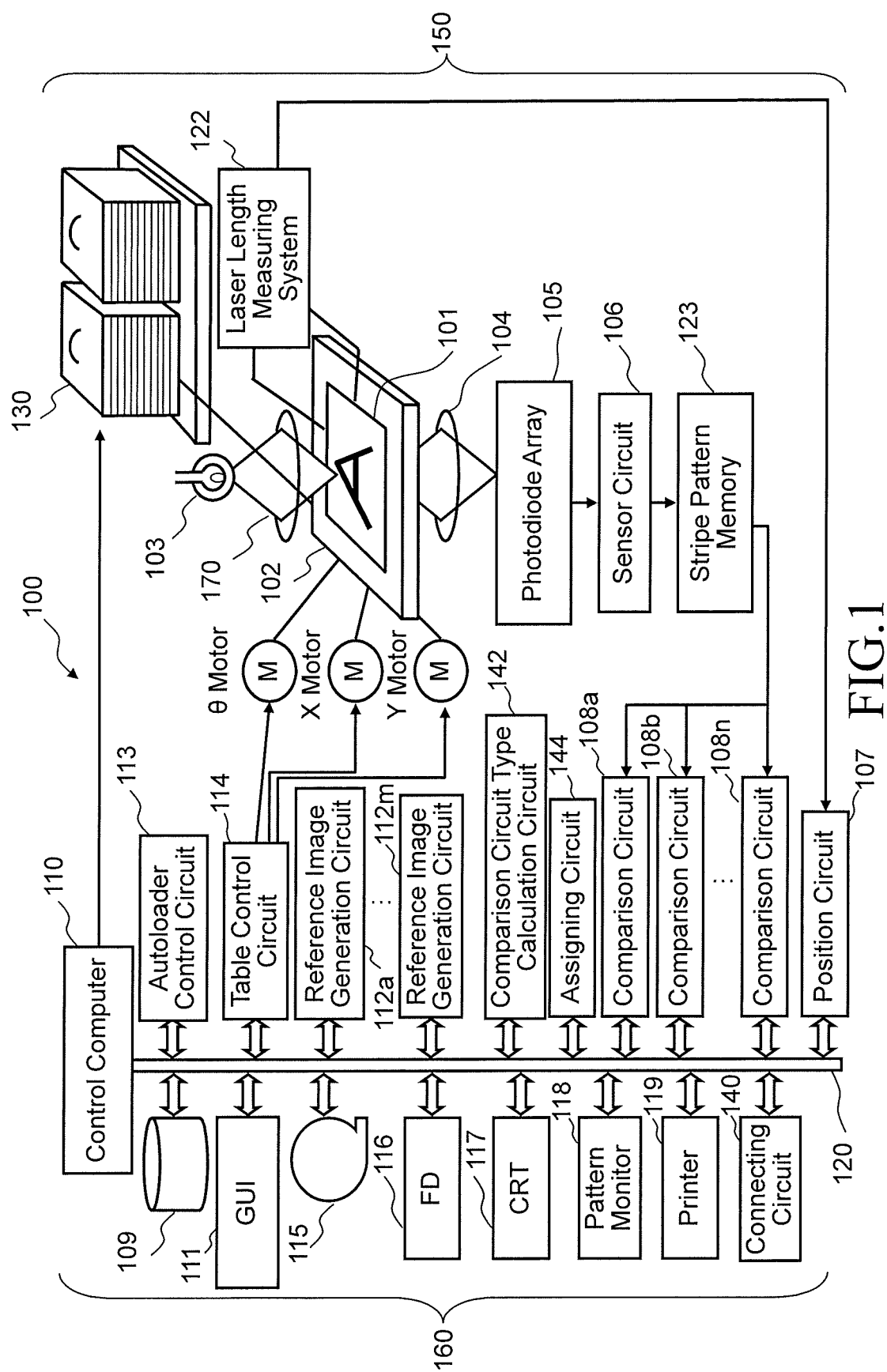
FIG. 1 illustrates a configuration of a pattern inspection apparatus according to a first embodiment.

FIG. 1 illustrates a configuration of a pattern inspection apparatus according to a first embodiment. As shown in FIG. 1, an inspection apparatus 100 that inspects defects of a pattern formed on an inspection substrate, such as a mask, includes an optical image acquisition mechanism 150 and a control system circuit 160.

The optical image acquisition mechanism 150 includes a light source 103, an illumination optical system 170, an XYθ table 102 arranged movably, a magnifying optical system 104, a photodiode array 105 (an example of a sensor), a sensor circuit 106, a stripe pattern memory 123, a laser length measuring system 122, and an autoloader 130. A substrate 101 conveyed from the autoloader 130 is placed on the XYθ table 102. The substrate 101 is, for example, an exposure photomask used for transfer printing a pattern onto a semiconductor substrate such as a wafer. A plurality of figure patterns to be inspected is formed on the photomask. The substrate 101 is disposed, for example, with its pattern-forming surface facing downward, on the XYθ table 102.

In the control system circuit 160, a control computer 110 which controls the whole of the inspection apparatus 100 is connected, through a bus 120, to a position circuit 107, a plurality of comparison circuits 108 (108a to 108n), a plurality of reference image generation circuits 112 (112a to 112m), an autoloader control circuit 113, a table control circuit 114, a connecting circuit 140, a comparison circuit type calculation circuit 142, an assigning circuit 144, a magnetic disk drive 109, a graphic user interface (GUI) circuit 111, a magnetic tape drive 115, a flexible disk drive (FD) 116, a CRT 117, a pattern monitor 118, and a printer 119. The sensor circuit 106 is connected to the stripe pattern memory 123 which is connected to a plurality of comparison circuits 108a to 108n. The XYθ table 102 is driven by the x, y, and e-axis motors, and an example of the stage.

Each " . . . circuit", such as the position circuit 107, the plurality of comparison circuits 108 (108a to 108n), the plurality of reference image generation circuits 112 (112a to 112m), the autoloader control circuit 113, the table control circuit 114, the connecting circuit 140, the comparison circuit type calculation circuit 142, and the assigning circuit 144 includes a processing circuit. As the processing circuit, for example, an electric circuit, computer, processor, circuit board, quantum circuit, semiconductor device, or the like can be used. Each " . . . circuit" may use common processing circuit (the same processing circuit), or different processing circuits (separate processing circuits). For example, each " . . . circuit", such as the position circuit 107, the plurality of comparison circuits 108 (108a to 108n), the plurality of reference image generation circuits 112 (112a to 112m), the autoloader control circuit 113, the table control circuit 114, the connecting circuit 140, the comparison circuit type calculation circuit 142, and the assigning circuit 144 may be configured and executed by the control computer 110. A program for causing a computer to execute the processor, etc. can be stored in a recording medium, such as the magnetic disk drive 109, magnetic tape drive 115, FD 116, ROM (Read Only Memory), or the like.

A plurality of comparison circuits 108a to 108n may be distinguished in advance such that some of them perform only the DD inspection and the others perform only the DB inspection. Alternatively, they may be configured, not to be particularly distinguished, to be able to correspond to both the processing. It is preferable for n and m to be integers of two or more, such as about 10.

In the inspection apparatus 100, an inspection optical system of large magnification is composed of the light source 103, the XYθ table 102, the illumination optical system 170, the magnifying optical system 104, the photodiode array 105, and the sensor circuit 106. The XYθ table 102 is driven by the table control circuit 114 under the control of the control computer 110. The XYθ table 102 can be moved by a drive system such as a three-axis (X, Y, and θ) motor, which drives the table in the directions of x, y, and θ. For example, a step motor can be used as each of these X, Y, and θ motors. The XYθ table 102 is movable in the horizontal direction and the rotation direction by the X-, Y-, and θ-axis motors. The movement position of the substrate 101 placed on the XYθ table 102 is measured by the laser length measuring system 122, and supplied to the position circuit 107. The transfer (feed) processing of the substrate 101 from the autoloader 130 to the XYθ table 102, and from the XYθ table 102 to the autoloader 130 is controlled by the autoloader control circuit 113.

Writing data (design data) used as a basis for forming patterns on the substrate 101 to be inspected is input from the outside of the inspection apparatus 100, and stored in the magnetic disk drive 109. The writing data defines a plurality of figure patterns, and each figure pattern is usually configured by combining a plurality of element figures. Such a figure pattern may be configured by one figure. Then, each pattern corresponding to and based on each figure pattern defined in the writing data is formed on the inspection substrate 101.

FIG. 1 shows configuration elements necessary for describing the first embodiment. It should be understood that other configuration elements generally necessary for the inspection apparatus 100 may also be included therein.

Figure 2:
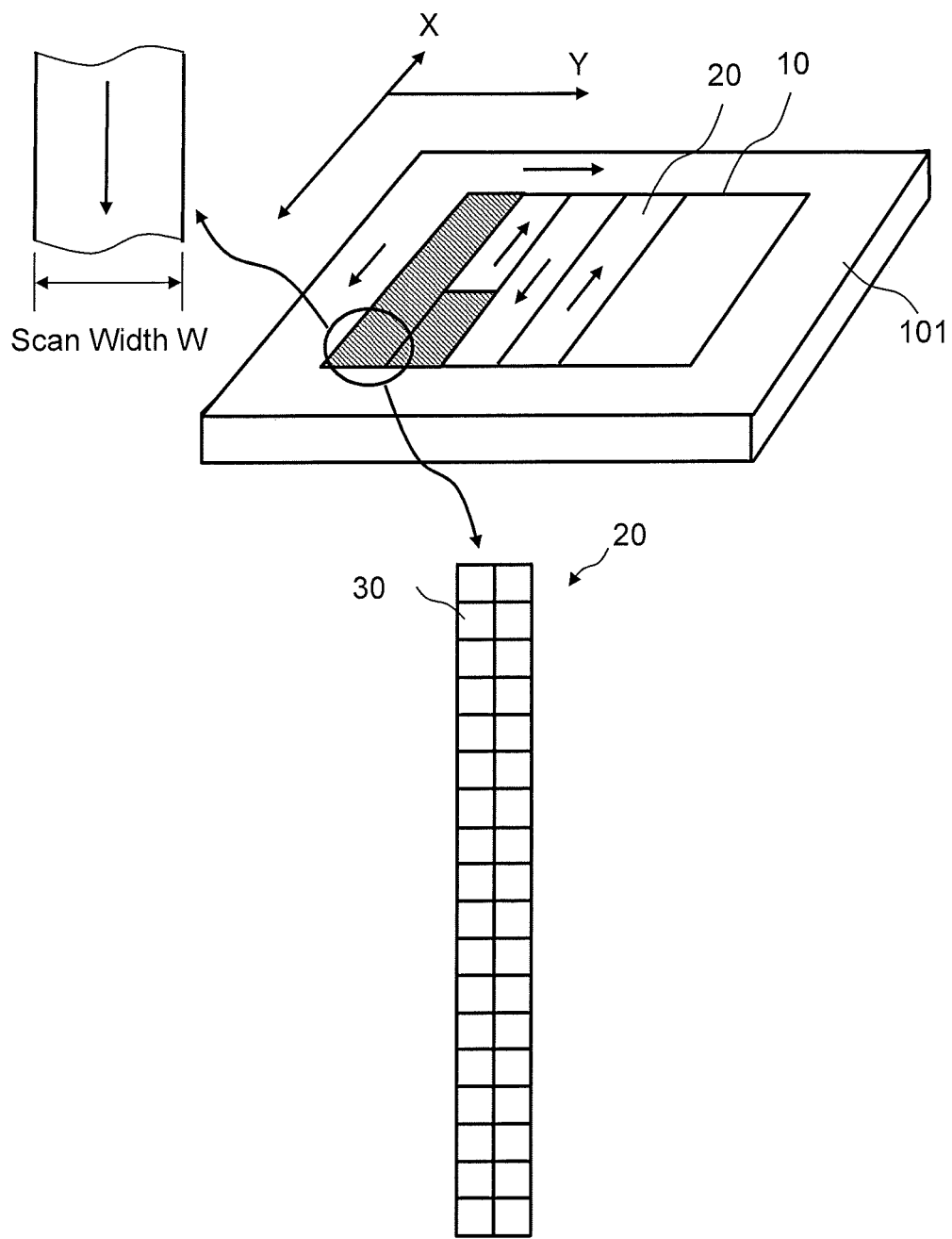
FIG. 2 is a conceptual diagram illustrating an inspection region according to the first embodiment.

FIG. 2 is a conceptual diagram illustrating an inspection region according to the first embodiment. As shown in FIG. 2, an inspection region 10 (the entire inspection region) of the substrate 101 is virtually divided into a plurality of strip-shaped inspection stripes 20 each having a scan width W in the y direction, for example. The inspection apparatus 100 acquires an image (a stripe region image) from each inspection stripe 20. That is, with respect to each of the inspection stripes 20, the inspection apparatus 100 captures (acquires) an image of a figure pattern arranged in the stripe region concerned with a laser light in the longitudinal direction (the x direction) of the stripe region concerned. In order to prevent a missing image, it is preferable that a plurality of inspection stripes 20 are set such that adjacent inspection stripes 20 overlap with each other by a predetermined margin width.

The photodiode array 105, which continuously moves relatively in the x direction by the movement of the XYθ table 120, acquires an optical image. The photodiode array 105 continuously captures optical images each having a scan width W as shown in FIG. 2. In other words, while moving relatively to the XYθ table 102 (stage), the photodiode array 105 being an example of a sensor captures, with an inspection light, optical images of patterns formed on the substrate 101. According to the first embodiment, after capturing (acquiring) an optical image in one inspection stripe 20, the photodiode array 105 moves in the y direction to the position of the next inspection stripe 20, and similarly captures another optical image having a scan width W continuously while moving in the direction reverse to the last image capturing direction. Thereby, the image capturing is repeated in the forward (FWD) and backward (BWD) directions, namely changing the direction reversely when advancing and returning.

In an actual inspection, as shown in FIG. 2, the stripe region image of each inspection stripe 20 is divided into a plurality of rectangular (including square) frame images 30 each having half the width of the scan width, for example. Then, inspection is performed for each frame image 30. A frame region is obtained by dividing the stripe region of each inspection stripe 20 by the size of the frame image 30. In other words, the stripe region of each inspection stripe 20 is divided into a plurality of rectangular frame regions each having half the width of the scan width, for example, as shown in FIG. 2. For example, it is divided into the size of 512×512 pixels. Therefore, a reference image to be compared with the frame image 30 is similarly generated for each frame region. In order to prevent a missing image, it is preferable that a plurality of frame images 30 are set such that adjacent frame images 30 overlap with each other by a predetermined margin width.

The direction of the image capturing is not limited to repeating the forward (FWD) and backward (BWD) movement. Images may be captured in a fixed one direction. For example, it is sufficient to repeat FWD and FWD, or alternatively, to repeat BWD and BWD.

Figure 3:
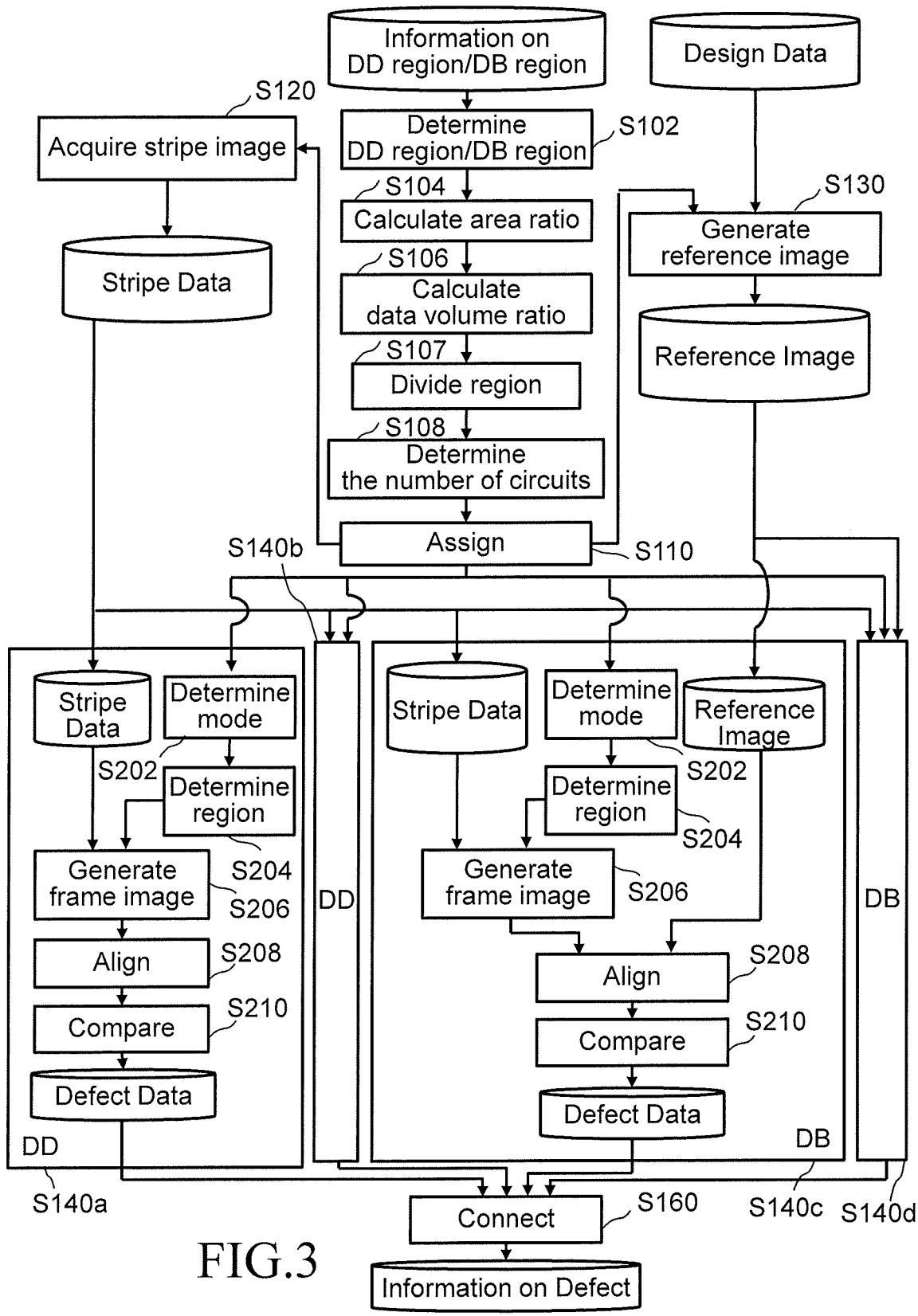
FIG. 3 is a flowchart showing main steps of an inspection method according to the first embodiment.

FIG. 3 is a flowchart showing main steps of an inspection method according to the first embodiment. In FIG. 3, the inspection method of the first embodiment executes a series of steps: a die-to-die (DD) region/die-to-database (DB) region determining step (S102), an area ratio calculating step (S104), a data volume ratio calculating step (S106), a region dividing step (S107), a number-of-circuits determining step (S108), an assigning step (S110), a stripe image acquiring step (S120), a reference image generating step (S130), a plurality of parallel inspection steps (S140a to S140d), and a connecting step (S160). Each of the plurality of inspection steps (S140a to S140d) executes a series of steps as internal steps: a mode determining step (S202), a region determining step (S204), a frame image generating step (S206), an alignment step (S208), and a comparing step (S210). In the case of FIG. 3, the DD inspection is carried out in two inspection steps S140a and 140b, and the DB inspection is carried out in two inspection steps S140c and 140d.

Figure 4:
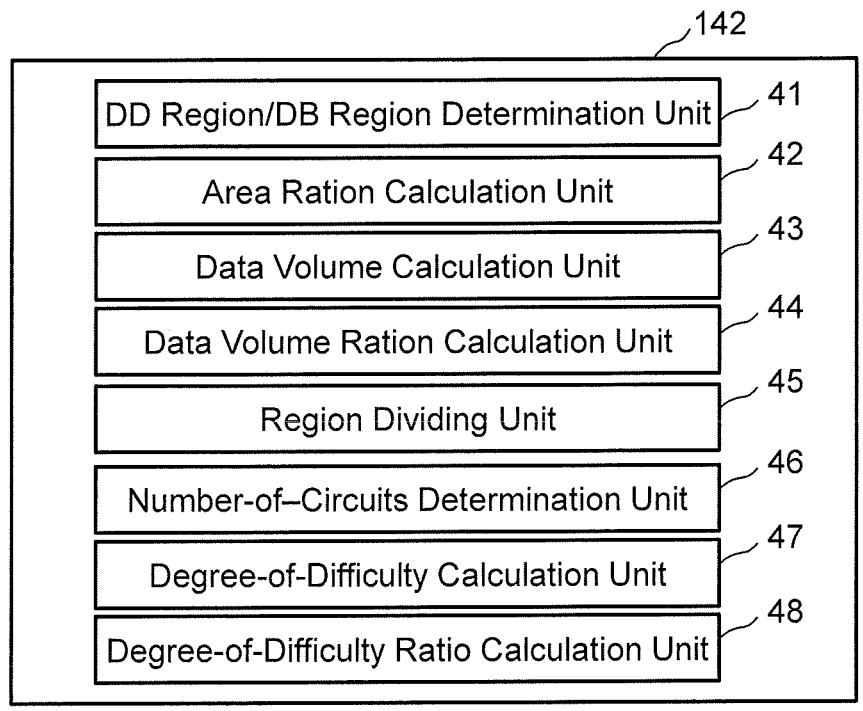
FIG. 4 shows an example of an internal configuration of a comparison circuit type calculation circuit according to the first embodiment.

FIG. 4 shows an example of an internal configuration of a comparison circuit type calculation circuit according to the first embodiment. In FIG. 4, in the comparison circuit type calculation circuit 142, there are arranged a die-to-die (DD) region/die-to-database (DB) region determination unit 41, an area ratio calculation unit 42, a data volume calculation unit 43, a data volume ratio calculation unit 44, a region dividing unit 45, a number-of-circuits determination unit 46, a degree-of-difficulty calculation unit 47, and a degree-of-difficulty ratio calculation unit 48. One of the group of the data volume calculation unit 43 and the data volume ratio calculation unit 44, and the group of the degree-of-difficulty calculation unit 47 and the degree-of-difficulty ratio calculation unit 48 may be omitted. Each of the " . . . units" such as the DD region/DB region determination unit 41, the area ratio calculation unit 42, the data volume calculation unit 43, the data volume ratio calculation unit 44, the region dividing unit 45, the number-of-circuits determination unit 46, the degree-of-difficulty calculation unit 47, and the degree-of-difficulty ratio calculation unit 48 includes processing circuitry. As the processing circuitry, for example, an electric circuit, computer, processor, circuit board, quantum circuit, or semiconductor device is used. Each " . . . unit" may use common processing circuitry (the same processing circuitry), or different processing circuitry (separate processing circuitry). Input data needed in the DD region/DB region determination unit 41, the area ratio calculation unit 42, the data volume calculation unit 43, the data volume ratio calculation unit 44, the region dividing unit 45, the number-of-circuits determination unit 46, the degree-of-difficulty calculation unit 47, and the degree-of-difficulty ratio calculation unit 48, and calculated results are stored in a memory (not shown) each time.

Figure 5:
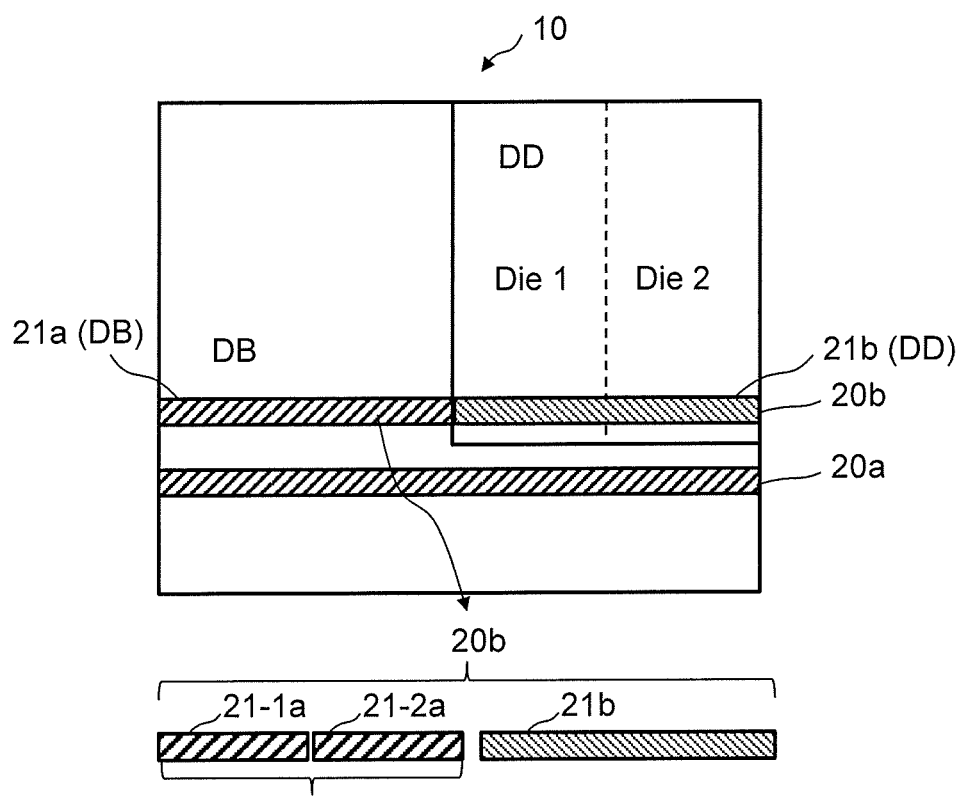
FIG. 5 shows an example of a die-to-die (DD) region/die-to-database (DB) region according to the first embodiment.

FIG. 5 shows an example of a die-to-die (DD) region/die-to-database (DB) region according to the first embodiment. As described above, when one substrate 101 is inspected, there is a case where a region to be inspected by the die-to-die (DD) method and a region to be inspected by the die-to-database (DB) method are intermingled. In the example of FIG. 5, in the inspection region 10 of the substrate 101, the upper right half region from the center portion is to be inspected by the DD method, and the other region is to be inspected by the DB method. For example, with respect to a region where repetitive patterns such as line and space patterns are formed, the DD inspection is desirable. In addition, with respect to a region having two region portions where the same pattern layouts are arranged, the DD inspection is desirable. In contrast, with respect to a region where an individual pattern(s) which is not repeated is arranged, the DB inspection is desirable. In the case of FIG. 5, in the region to be inspected by the DD method, its left half is denoted as a die 1, and right half is denoted as a die 2. On the other hand, the inspection stripes 20 are set by dividing the inspection region 10 of the substrate 101 into a plurality of strip-shaped stripes regardless of whether the region is to be inspected by the DD method or the DB method. Therefore, in each inspection stripe 20, there is a case where one of a region to be inspected by the DD method and a region to be inspected by the DB method exits, or where both of the regions exist. Furthermore, for each of a plurality of inspection stripes 20, the positions and/or the sizes of the region to be inspected by the DD method and the region to be inspected by the DB method may be various. Then, in the first embodiment, DD inspection is performed in the region which should be inspected by the DB method, and DB inspection is performed in the region which should be inspected by the DD method. Therefore, first, the user inputs a region (DD region) to be inspected by the DD method and a region (DB region) to be inspected by the DB method, through a GUI circuit 111, and then, information on the DD region/DB region is registered in the magnetic disk drive 109, etc.

In the DD region/DB region determining step (S102), for each inspection stripe 20 (region), the DD region/DB region determination unit 41 determines a region portion to be inspected by the die-to-die (DD) method and a region portion to be inspected by the die-to-database (DB) method in the inspection stripe 20 concerned. Specifically, it operates as follows: In the case of FIG. 5, with respect to the inspection stripe 20a, all of the region is determined to be a DB region, for example. On the other hand, with respect to the inspection stripe 20b, the left half region is determined to be a DB region 21a, and the right half region is determined to be a DD region 21b, for example. When the pattern formed in the DD region 21b is not a simple repetitive pattern, if two regions in which the same pattern layout is arranged are beforehand specified (registered), the DD region/DB region determination unit 41 further divides the DD region 21b into two regions to perform determination.

In the area ratio calculating step (S104), the area ratio calculation unit 42 calculates, for each inspection stripe 20 (region), an area ratio between the region portion to perform die-to-die (DD) inspection processing and the region portion to perform die-to-database (DB) inspection processing in the inspection stripe 20 concerned. In the case of FIG. 5, with respect to the inspection stripe 20a, it is calculated that the DD region is 0% (or 0), and the DB region is 100% (or 1). Alternatively, it is calculated that the DD region/DB region is 0 (=0). With respect to the inspection stripe 20b, it is calculated that the DD region is 50% (or 0.5), and the DB region is 50% (or 0.5). Alternatively, it is calculated that the DD region/DB region is 0.5 (=0.5).

As to the inspection stripe 20 where the DD region 21b and the DB region 21a are intermingled, since comparison is performed between the die 1 and the die 2 in the DD region 21b, the region necessary for inspection becomes about ½. Therefore, processing is completed faster than the case of performing a DB inspection of the DB region 21a having the same size. That is, the processing time of the DB inspection of the DB region 21a is longer than that of the DD inspection of the DD region 21b. For example, when the area ratio between the DD region 21b and the DB region 21a is 1:1, the DB inspection takes twice the processing time compared to the DD inspection. As will be described later, according to the first embodiment, the comparison circuit 108 to perform the DD inspection, and the comparison circuit 108 to perform the DB inspection are made to execute in parallel. Therefore, even if processing of one comparison circuit is completed earlier, inspection of the target inspection stripe 20 is not completed until processing of the other comparison circuit is completed. Thus, the comparison circuit whose processing has finished earlier is in a standby state until processing of the other comparison circuit is completed, which is inefficient. Therefore, as described above, by calculating the area ratio between the DD region 21b and the DB region 21a, it becomes possible to adjust the region in the inspection stripe 20 to be processed by one comparison circuit so that processing of one of the DD inspection and the DB inspection may not be behind the other. In the case of FIG. 5, the DB region 21a is divided into a DB region 21-1a and a DB region 21-2a.

Another factor of the processing time of the DB inspection taking longer is that the time for generating a reference image based on design pattern data takes long. With respect to the DB inspection, it is necessary to generate a reference image of the target inspection stripe 20 by the time when an optical image of the target inspection stripe 20 has been acquired by a scanning operation. If generation of a reference image is delayed to acquisition of an optical image, inspection processing is in a stand-by state during the delay time. Then, in order that reference image generation may not be delayed, the following calculation is performed.

In the data volume ratio calculating step (S106), the data volume calculation unit 43 calculates, for each inspection stripe 20, the data volume (data size) of the design pattern data of the inspection stripe 20 concerned. Specifically, the data volume calculation unit 43 reads writing data from the magnetic disk drive 109, and, calculates the data volume of pattern data of a figure pattern arranged in the DB region 21a of the target inspection stripe 20. Next, the data volume ratio calculation unit 44 calculates, for each inspection stripe 20, a data volume ratio between the data volume and a data volume threshold Th'. As the data volume threshold Th', a desired value may be set in advance. For example, it is preferable to set a data volume which can be image-developed within a scanning time of the inspection stripe 20.

Figure 6:
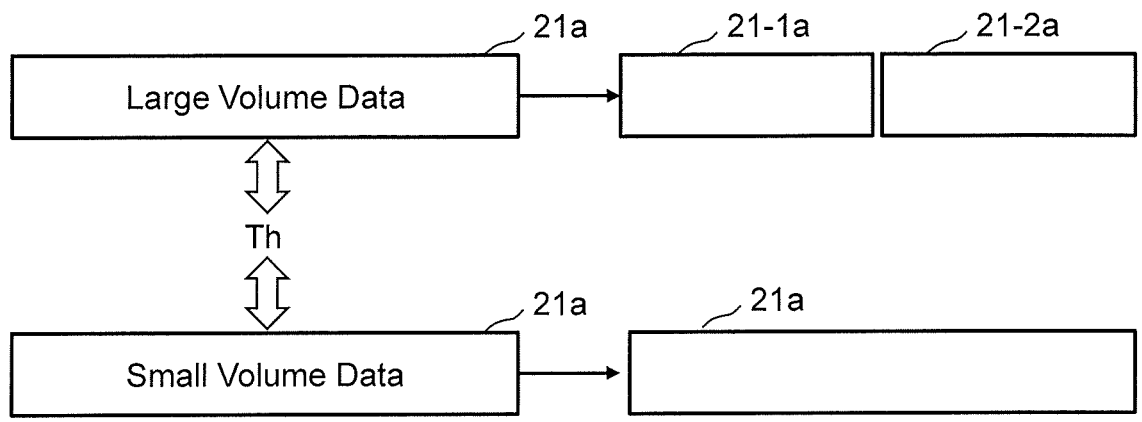
FIG. 6 shows a relation between a region dividing number and a data volume according to the first embodiment.

FIG. 6 shows a relation between a region dividing number and a data volume according to the first embodiment. In FIG. 6, if the data volume of a figure pattern arranged in the DB region 21a is smaller than the data volume threshold Th', it is sufficient to generate a reference image of the whole of the DB region 21*a* by one reference image generation circuit 112. In contrast, if the data volume of a figure pattern arranged in the DB region 21*a* is larger than the data volume threshold Th', the DB region 21*a* needs to be divided into two regions of the DB region 21-1*a* and the DB region 21-2*a* to be processed in parallel by two reference image generation circuits 112 in order not to be late for the timing of comparison processing. Therefore, as described above, by calculating the ratio between the data volumes, it is possible to make an adjustment not to cause a delay in generation of the reference image.

It is also preferable to perform a degree-of-difficulty ratio calculating step (not shown) instead of the data volume ratio calculating step (S106). In other words, it is also preferable to calculate a ratio of degree of difficulty instead of calculating a ratio of data volume of design pattern data in the DB region 21*a*. In that case, the degree-of-difficulty calculation unit 47 calculates, for each inspection stripe 20, the degree of difficulty in generating a reference image of the inspection stripe 20 concerned, based on the design pattern data of the inspection stripe 20 concerned. As an index of the degree of difficulty, preferably, the number of figures, pattern density, or pattern line width in the DB region 21*a* is used. If the number of figures is large, it takes time to perform image development for generating a reference image. Similarly, if the pattern density is high, it takes time to perform image development for generating a reference image. Moreover, if the pattern line width is narrow, it takes time to perform image development for generating a reference image. Then, the degree-of-difficulty ratio calculation unit 48 calculates, for each inspection stripe 20, a degree-of-difficulty ratio between the degree of difficulty and a threshold of the degree of difficulty (degree-of-difficulty threshold).

Figure 7:
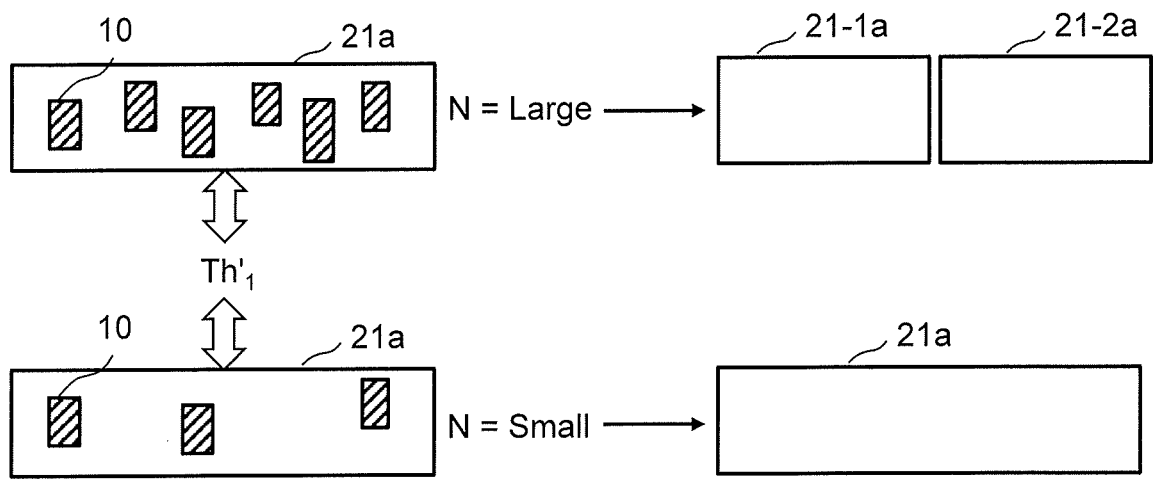
FIG. 7 shows a relation between a region dividing number and the number of figures according to the first embodiment.

FIG. 7 shows a relation between a region dividing number and the number of figures according to the first embodiment. In FIG. 7, if the number of figures (an example of the degree of difficulty) of a figure pattern arranged in the DB region 21*a* is smaller than a number-of-figures threshold Th" 1 (an example of the degree-of-difficulty threshold), it is sufficient to generate a reference image of the whole of the DB region 21*a* by one reference image generation circuit 112. In contrast, if the number of figures of a figure pattern arranged in the DB region 21*a* is larger than the number-of-figures threshold Th" 1, the DB region 21*a* needs to be divided into two regions of the DB region 21-1*a* and the DB region 21-2*a* to be processed in parallel by two reference image generation circuits 112 in order not to be late for the timing of comparison processing. Therefore, as described above, by calculating the ratio of degree of difficulty, it is possible to make an adjustment not to cause a delay in generation of the reference image. As the number-of-figures threshold Th" 1, a desired value may be set in advance. For example, it is preferable to set the number of figures which can be image-developed within a scanning time of the inspection stripe 20.

Figure 8:
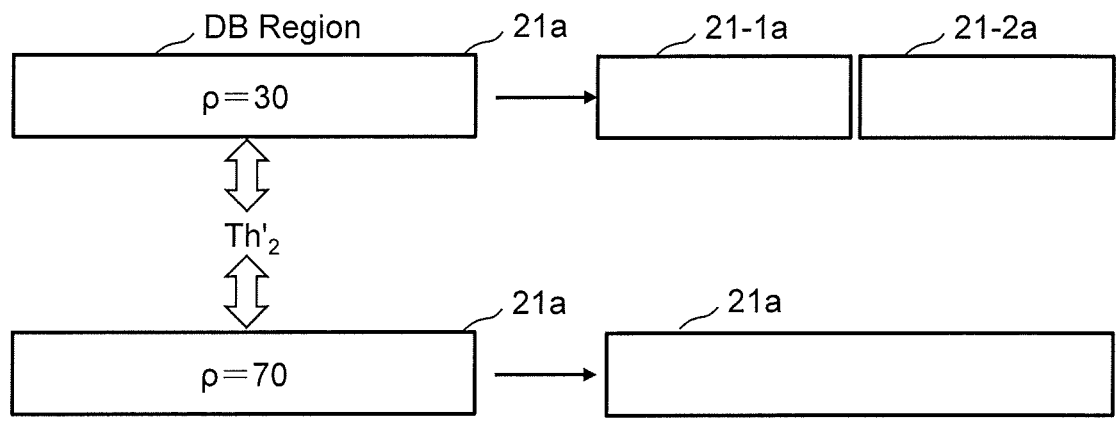
FIG. 8 shows a relation between a region dividing number and a pattern density according to the first embodiment.

FIG. 8 shows a relation between a region dividing number and a pattern density according to the first embodiment. In FIG. 8, if the pattern density (an example of the degree of difficulty) of a figure pattern arranged in the DB region 21*a* is smaller than a pattern density threshold Th" 2 (another example of the degree-of-difficulty threshold), it is sufficient to generate a reference image of the whole of the DB region 21*a* by one reference image generation circuit 112. In contrast, if the pattern density of a figure pattern arranged in the DB region 21*a* is larger than the pattern density threshold Th" 2, the DB region 21*a* needs to be divided into two regions of the DB region 21-1*a* and the DB region 21-2*a* to be processed in parallel by two reference image generation circuits 112 in order not to be late for the timing of comparison processing. Therefore, as described above, by calculating the ratio of degree of difficulty, it is possible to make an adjustment not to cause a delay in generation of the reference image. As the pattern density threshold Th" 2, a desired value may be set in advance. For example, it is preferable to set a pattern density which can be image-developed within a scanning time of the inspection stripe 20.

Figure 9:
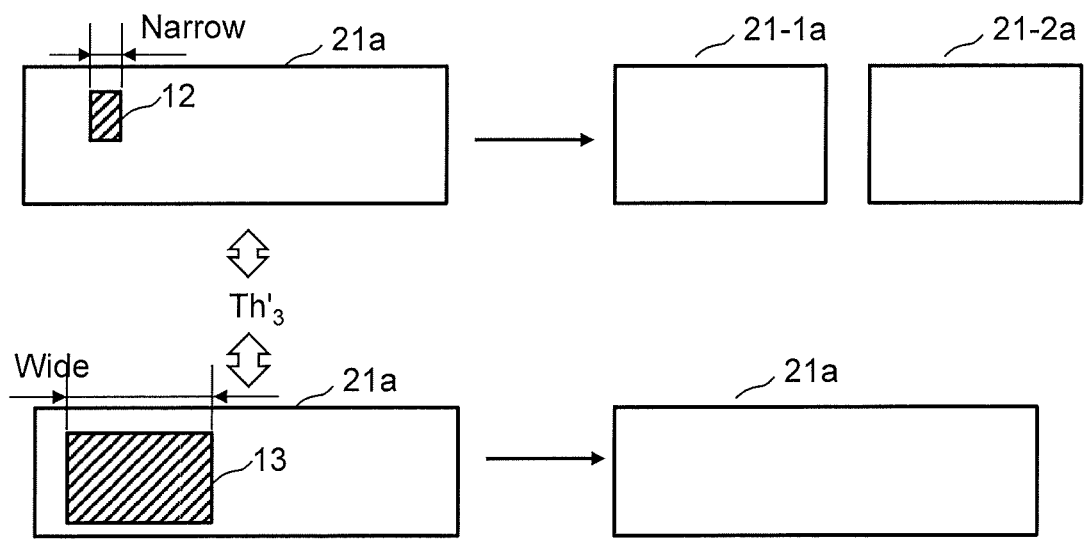
FIG. 9 shows a relation between a region dividing number and a pattern line width according to the first embodiment.

FIG. 9 shows a relation between a region dividing number and a pattern line width according to the first embodiment. In FIG. 9, if the pattern line width (an example of the degree of difficulty) of a figure pattern arranged in the DB region 21*a* is larger (wider) than a pattern line width threshold Th" 3 (another example of the degree-of-difficulty threshold), it is sufficient to generate a reference image of the whole of the DB region 21*a* by one reference image generation circuit 112. In contrast, if the pattern line width of a figure pattern arranged in the DB region 21*a* is smaller (narrower) than the pattern line width threshold Th" 3, the DB region 21*a* needs to be divided into two regions of the DB region 21-1*a* and the DB region 21-2*a* to be processed in parallel by two reference image generation circuits 112 in order not to be late for the timing of comparison processing. Therefore, as described above, by calculating the ratio of degree of difficulty, it is possible to make an adjustment not to cause a delay in generation of the reference image. As the pattern line width threshold Th" 3, a desired value may be set in advance. For example, it is preferable to set a pattern line width which can be image-developed within a scanning time of the inspection stripe 20.

In the region dividing step (S107), based on the area ratio between the DD region and the DB region, the region dividing unit 45 divides the region (for example, DB region 21*a*) which takes a longer inspection processing time into a plurality of small regions (for example, DB region 21-1*a*, DB region 21-2*a*). Moreover, based on the ratio of data volume or the ratio of degree of difficulty described above, the region dividing unit 45 divides the DB region 21*a* into a plurality of small regions, such as 21-1*a* and 21-2*a*.

For example, if DD region/DB region (area ratio)=1 (all being DD region 21*b*), dividing is not performed to maintain one region. Since all is the DD region 21*b*, the data volume ratio (or ratio of degree of difficulty) does not exist, or alternatively, it is zero.

For example, if DD region/DB region (area ratio)=0.7, it is temporarily determined that each of the DD region 21*b* and the DB region 21*a* maintains one region as it is.

Moreover, if the data volume ratio (or ratio of degree of difficulty) is 1 or less, each of them maintains one region as it is without dividing. In that case, there are two regions as a result in the target inspection stripes 20. If the data volume ratio (or ratio of degree of difficulty) is greater than 1 and equal to or less than 2, the DB region 21*a* is divided into two regions. In that case, there are three regions as a result in the target inspection stripes 20. If the data volume ratio (or ratio of degree of difficulty) is greater than 2, the DB region 21*a* is divided into three regions. In that case, there are four regions as a result in the target inspection stripes 20.

For example, if DD region/DB region (area ratio)=0.5, it is temporarily determined that the DD region 21*b* maintains one region as it is, and the DB region 21*a* is divided into two small regions. Moreover, if the data volume ratio (or ratio of degree of difficulty) is 2 or less, the DD region 21*b* maintains one region as it is, and the DB region 21*a* is divided into two regions. In that case, there are three regions as a result in the target inspection stripes 20. If the data volume ratio (or ratio of degree of difficulty) is greater than 2, the DD region 21*b* maintains one region and the DB region 21*a* is divided into three regions. In that case, there are four regions as a result in the target inspection stripes 20.

For example, if DD region/DB region (area ratio)=0 (all being DB region 21*a*), it is temporarily determined that the DB region 21*a* is one region. Moreover, if the data volume ratio (or ratio of degree of difficulty) is 1 or less, one region is maintained as it is without dividing. If the data volume ratio (or ratio of degree of difficulty) is greater than 1 and equal to or less than 2, the DB region 21*a* is divided into two regions. In that case, the total of the target inspection stripes 20 is three regions. If the data volume ratio (or ratio of degree of difficulty) is greater than 2, the DB region 21*a* is divided into three regions. In that case, the total of the target inspection stripes 20 is four regions.

In the number-of-circuits determining step (S108), for each inspection stripe 20, the number-of-circuits determination unit 46 (determination unit) variably determines, based on the area ratio, the number of the comparison circuits 108 for performing DD inspection processing and the number of the comparison circuits 108 for performing DB inspection processing which serve as output destinations of optical image data. Similarly, for each inspection stripe 20, the number-of-circuits determination unit 46 variably determines, based on the data volume ratio or the ratio of degree of difficulty, the number of the comparison circuits 108 for performing DB inspection processing which serves as an output destination of optical image data. In other words, the number-of-circuits determination unit 46 determines the number of the comparison circuits 108 for performing DB inspection processing based on the data volume ratio or the ratio of degree of difficulty to be greater than the number of them based on the area ratio. Specifically, the number-of-circuits determination unit 46 determines the number of comparison circuits to be corresponding to the number of regions obtained as a result of the region dividing step (S107).

For example, if DD region/DB region (area ratio)=0.5 and the data volume ratio (or ratio of degree of difficulty) is 2 or less, it is determined that one comparison circuit for DD inspection, and two comparison circuits for DB inspection. If the data volume ratio (or ratio of degree of difficulty) is greater than 2, it is determined that one comparison circuit is for DD inspection, and three comparison circuits are for DB inspection.

For example, if DD region/DB region (area ratio)=0 (all being DB region 21*a*) and the data volume ratio (or ratio of degree of difficulty) is 1 or less, it is temporarily determined that zero comparison circuit is for DD inspection, and one comparison circuit is DB inspection. If the data volume ratio (or ratio of degree of difficulty) is greater than 1 and equal to or less than 2, it is determined that zero comparison circuit is for DD inspection, and two comparison circuits for DB inspection. If the data volume ratio (or ratio of degree of difficulty) is greater than 2, it is determined that zero comparison circuit is for DD inspection, and three comparison circuits are for DB inspection.

In the assigning step (S110), for each one of a plurality of inspection stripes 20, the assigning circuit 144 (inspection control unit) individually outputs optical image data of the inspection stripe 20 concerned to the comparison circuits 108, whose number has been variably set for each inspection stripe 20, in a plurality of comparison circuits 108, and instructs (commands) each comparison circuit 108, serving as an output destination of optical image data, to perform DD inspection processing or DB inspection processing. For each inspection stripe 20, the assigning circuit 144 variably controls, based on the area ratio described above, the number of the comparison circuits 108 for performing DD inspection processing and the number of the comparison circuits 108 for performing DB inspection processing which serve as output destinations of optical image data. Moreover, for each inspection stripe 20, the assigning circuit 144 variably controls the number of the comparison circuits 108 for performing DB inspection processing, based on the data volume ratio described above. Alternatively, for each inspection stripe 20, the assigning circuit 144 variably controls the number of the comparison circuits 108 for performing DB inspection processing, based on the ratio of degree of difficulty described above. Specific operations will be described below. It is also preferable that the contents of processing of the assigning circuit 144 described below is performed by the control computer 110.

Figure 10:
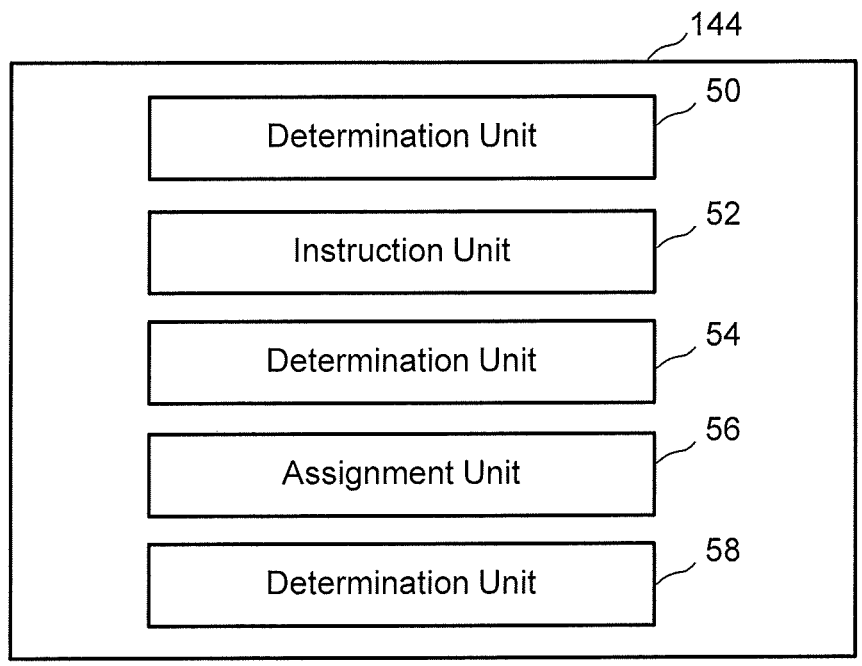
FIG. 10 shows an example of an internal configuration of an assigning circuit according to the first embodiment.

FIG. 10 shows an example of an internal configuration of an assigning circuit according to the first embodiment. In FIG. 10, in the assigning circuit 144, there are arranged a determination unit 50, an instruction unit 52, a determination unit 54, an assignment unit 56, and a determination unit 58. Each of the " . . . units" such as the determination unit 50, the instruction unit 52, the determination unit 54, the assignment unit 56, and the determination unit 58 includes processing circuitry. As the processing circuitry, for example, an electric circuit, computer, processor, circuit board, quantum circuit, or semiconductor device is used. Each " . . . unit" may use common processing circuitry (the same processing circuitry), or different processing circuitry (separate processing circuitry). Input data needed in the determination unit 50, the instruction unit 52, the determination unit 54, the assignment unit 56, and the determination unit 58, and calculated results are stored in a memory (not shown) each time.

Figure 11:
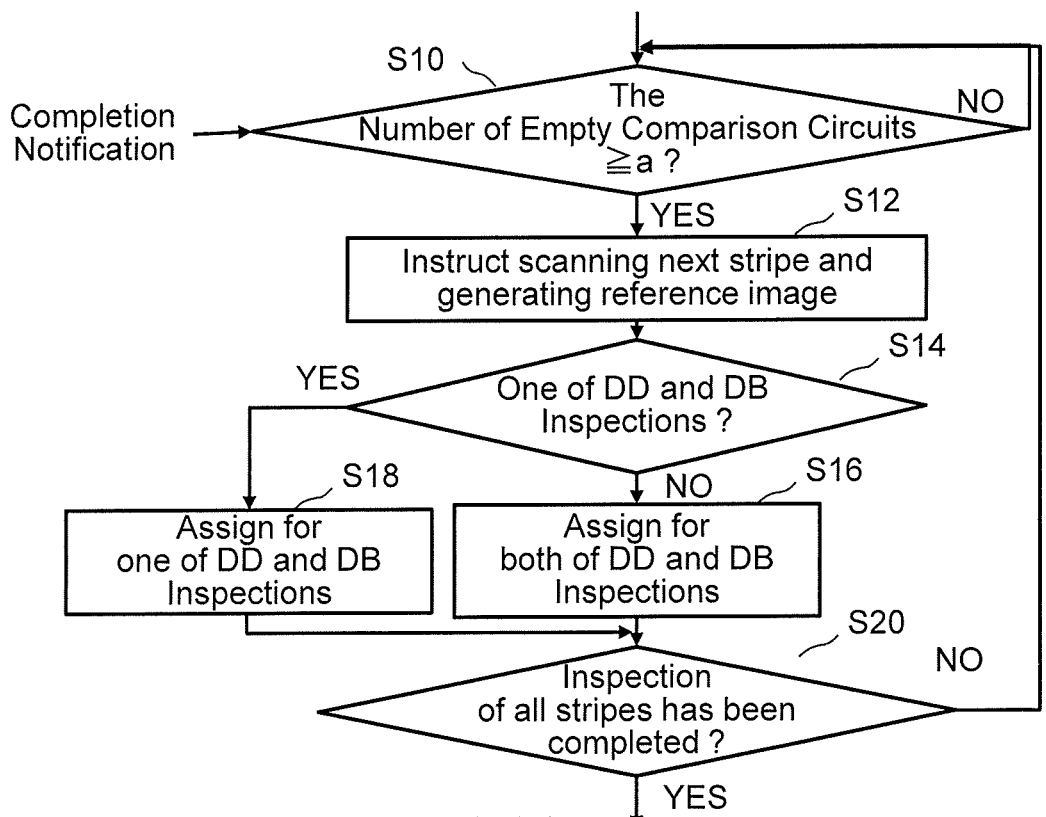
FIG. 11 is a flowchart showing an example of internal steps of an assigning step according to the first embodiment.

FIG. 11 is a flowchart showing an example of internal steps of an assigning step according to the first embodiment. In FIG. 11, the assigning step (S110) executes a series of steps as internal steps: a number-of-empty-comparison-circuits determining step (S10), a scan and reference-image-generation instructing step (S12), a DD/DB determining step (S14), an assigning step (S16), an assigning step (S18), and a stripe processing determining step (S20).

In the number-of-empty-comparison-circuits determining step (S10), for each inspection stripe 20, the determination unit 50 determines whether there exist empty comparison circuits 108 whose number is greater than or equal to "a" being the number of circuits variably determined with respect to a target inspection stripe 20, based on the area ratio, the data volume ratio, or the ratio of degree of difficulty. After processing is completed, a completion notification is output to the assigning circuit 144 from each comparison circuit 108. According to the completion notification, it is possible to determine which comparison circuit is empty (waiting for processing). If empty comparison circuits 108 whose number is greater than or equal to "a" being the number of circuits variably determined do not exist, it is waited until the comparison circuits 108 of greater than or equal to "a" being the determined number of circuits have become empty.

In the scan and reference-image-generation instructing step (S12), when there exist empty comparison circuits 108 whose number is greater than or equal to "a" being the number of circuits determined with respect to the target inspection stripe 20, the instruction unit 52 instructs, through the control computer 110, the optical image acquisition mechanism 150 to scan the next inspection stripe 20. As will be described later, the optical image acquisition mechanism 150 starts scanning of the next inspection stripe 20 in accordance with the instruction. By letting the scanning operation of the next inspection stripe 20 wait until necessary number of comparison circuits 108 have become empty, it becomes unnecessary to dispose a buffer with large data capacity. Moreover, the instruction unit 52 outputs region information of a target region to generate a reference image(s) to the reference image generation circuits 112, whose number is the number of the DB regions 21a of the next inspection stripe 20, and directs the reference image generation circuits 112 to generate a reference image(s) of the target region in the next inspection stripe 20. Then, the reference image generation circuit 112 starts generating a reference image of the next inspection stripe 20 in accordance with directions as will be described later. If scanning operation and reference image generation processing are performed in parallel for the target inspection stripe 20, and the reference image generation is completed during the scanning operation, and besides, if the conditions are ready for the next scanning operation, the conditions are ready for reference image generation for the next inspection stripe 20 by a plurality of reference image generation circuits 112 simultaneously. Therefore, a scanning instruction and a reference image generating instruction can be output simultaneously.

Scanning is performed for the inspection stripe 20 which is given the scanning operation instruction.

In the stripe image acquiring step (S120), the optical image acquisition mechanism 150 acquires optical image data of a plurality of inspection stripes 20 (regions) from the substrate 101 where a plurality of figure patterns are formed. Specifically, with respect to each inspection stripe 20, the optical image acquisition mechanism 150 acquires optical image data of the inspection stripe 20 concerning which a scanning operation has been directed. The detailed operations are as follows: The XYθ table 102 is moved to the position where a target inspection stripe 20 can be image-captured. A pattern formed on the substrate 101 is irradiated with a laser light (e.g., DUV light) serving as an inspection light, whose wavelength is equal to or shorter than that of the ultraviolet region, from the appropriate light source 103 through the illumination optical system 170. A light having passed through the substrate 101 is focused, through the magnifying optical system. 104, to form an image on the photodiode array 105 (an example of a sensor) as an optical image to be input thereinto.

A pattern image focused/formed on the photodiode array 105 is photoelectrically converted by each light receiving element of the photodiode array 105, and further, analog-to-digital (A/D) converted by the sensor circuit 106. Then, pixel data for the inspection stripe 20 to be measured is stored in the stripe pattern memory 123. When capturing an image of the pixel data (stripe region image), for example, a dynamic range where the case of 60% of the illumination light amount being incident is the maximum gray level is used as the dynamic range of the photodiode array 105. Measurement data (pixel data) is, for example, 8-bit unsigned data, and indicates a gray scale level (light intensity) of brightness of each pixel.

In the reference image generating step (S130), the reference image generation circuits 112a to 112m (reference image generating units) generate a plurality of reference images corresponding to stripe images (optical images) of a plurality of inspection stripes 20 (regions). According to the first embodiment, as a reference image of each inspection stripe 20, a reference image is generated for each frame region so that it may correspond to the frame image 30. However, it is not limited thereto. It is also preferable to generate a reference image for each inspection stripe 20. Specifically, it operates as follows: Each of the reference image generation circuits 112a to 112m inputs a generation instruction, reads writing data (design pattern data) with respect to a specified DB region 21a of the target inspection stripe 20 from the storage drive 109 through the control computer 110, and converts each figure pattern defined in the read design pattern data into image data of binary or multiple values.

Here, basics of figures defined by the design pattern data are, for example, rectangles and triangles. For example, there is stored figure data defining the shape, size, position, and the like of each pattern figure by using information, such as coordinates (x, y) of the reference position of the figure, lengths of sides of the figure, and a figure code serving as an identifier for identifying the figure type such as rectangles, triangles and the like.

When design pattern data used as the figure data is input to the reference image generation circuits 112a to 112m, the data is developed into data of each figure. Then, the figure code indicating the figure shape, the figure dimensions, and the like of each figure data are interpreted. Then, each of the reference image generation circuits 112a to 112m develops each figure data to design pattern image data of binary or multiple values as a pattern to be arranged in squares in units of grids of predetermined quantization dimensions, and outputs the developed data. In other words, each of the reference image generation circuits 112a to 112m reads design data, calculates an occupancy rate occupied by a figure in the design pattern, for each square region obtained by virtually dividing the frame region into squares in units of predetermined dimensions, and outputs n-bit occupancy rate data (design image data). For example, it is preferable to set one square as one pixel. Assuming that one pixel has a resolution of $1/2^8 (=1/256)$, the occupancy rate in each pixel is calculated by allocating small regions which correspond to the region of figures arranged in the pixel concerned and each of which corresponds to $1/256$ resolution. Then, 8-bit occupancy rate data is generated. The square region (inspection pixel) may be in accordance with the pixel of measured data.

Next, each of the reference image generation circuits 112a to 112m performs appropriate filter processing, using a filter function, on design image data of a design pattern which is image data of a figure.

Figure 12:
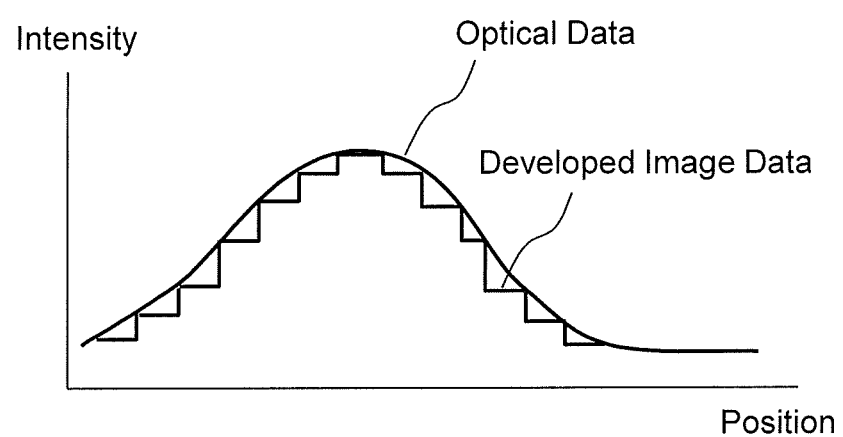
FIG. 12 illustrates filter processing according to the first embodiment.

FIG. 12 illustrates filter processing according to the first embodiment. Since pixel data of the optical image acquired from the substrate 101 is in a state affected by filtering due to resolution characteristics etc. of the optical system used for image-capturing, in other words, in an analog state continuously changing, as shown in FIG. 12, for example, the optical image is different from the developed image (design image) whose image intensity (gray scale value) is represented by digital values. Therefore, the reference image generation circuit 112 performs image processing (filter processing) on the developed image in order to generate a reference image close to the optical image. Thereby, it is possible to match design image data being image data on the design side whose image intensity (gray scale level) is in digital values with image generation characteristics of measured data (optical image).

As described above, the optical image (stripe data) of the target inspection stripe 20 is acquired, and its reference image is generated. Next, image data of these images is assigned to a plurality of comparison circuits 108a to 108n.

When a plurality of comparison circuits 108a to 108n are distinguished in advance to circuits for the DD inspection and to circuits for the DB inspection, the following steps are carried out.

In the DD/DB determining step (S14), for each inspection stripe 20, the determination unit 54 determines whether to perform one of the DD inspection and the DB inspection or to perform both of them, with respect to the target inspection stripe 20.

In the assigning step (S16), in the case of performing both the DD inspection and the DB inspection, for each inspection stripe 20, the assignment unit 56 assigns comparison processing to the determined number of comparison circuits 108, outputs an instruction command for executing an inspection with identification information on an inspection mode to be individually performed, and information on a region to be inspected, and controls the stripe pattern memory 123 to output stripe data (stripe region image). When outputting stripe data, it is output with data indicating the position of the substrate 101 on the XYθ table 102 output from the position circuit 107. Moreover, in the case of performing the DB inspection, the assignment unit 56 controls the reference image generation circuit 112 to output a reference image of a corresponding DB region to the comparison circuit which performs the DB inspection.

In the assigning step (S18), in the case of performing one of the DD inspection and the DB inspection, for each inspection stripe 20, the assignment unit 56 assigns comparison processing to the determined number of comparison circuits 108, outputs an instruction command for executing an inspection with identification information on an inspection mode to be performed, and information on a region to be inspected, and controls the stripe pattern memory 123 to output stripe data (stripe region image). When outputting stripe data, it is output with data indicating the position of the substrate 101 on the XYθ table 102 output from the position circuit 107. Moreover, the assignment unit 56 controls the reference image generation circuit 112 to output a reference image of a corresponding DB region to the comparison circuit which performs the DB inspection. With respect to the other one of the DD inspection and the DB inspection, which is not executed, the assignment unit 56 outputs an instruction command to the comparison circuit 108 which was due to perform the inspection that is not carried out. The comparison circuit 108 which receives no stripe data in spite of having received an instruction command outputs a completion notification to the assigning circuit 144 without performing comparison processing. Alternatively, it is also acceptable for the assignment unit 56 not to output an instruction command to the other one, not being executed, of the DD inspection and the DB inspection. In that case, the comparison circuit 108 which was due to perform the inspection that is not carried out is just maintained in a standby state.

If a plurality of comparison circuits 108a to 108n are not distinguished in advance for DD inspection and for DB inspection, and are configured to be able to perform both the inspections, the DD/DB determining step (S14) and the assigning step (S18) can be omitted, and the assigning step (S16) should be performed.

In the stripe processing determining step (S20), the determination unit 58 determines whether inspection of all the inspection stripes 20 has been completed. If there is an inspection stripe 20 which has not been inspected yet, it returns to the number-of-empty-comparison-circuits determining step (S10), and each step from the number-of-empty-comparison-circuits determining step (S10) to the stripe processing determining step (S20) is repeated until inspection of all the inspection stripes 20 has been completed. When the inspection of all the inspection stripes 20 has been completed, the assigning step (S110) ends.

As described above, target stripe data, an instruction command, and information on a region to be inspected are output to each of the comparison circuits 108 whose number is "a" being the determined number of circuits. Moreover, the reference image of a corresponding DB region 21a is output to the comparison circuit 108 which executes DB inspection in the determined number of the comparison circuits 108. For example, stripe image data of the first inspection stripe 20 is output to the comparison circuits 108a to 108c. Stripe image data of the second inspection stripe 20 is output to the comparison circuits 108d to 108g. Stripe image data of the third inspection stripe 20 is output to the comparison circuits 108h to 108j. If there are "a" empty comparison circuits, stripe image data of the fourth inspection stripe 20 is output to the comparison circuits 108a to 108c again. Stripe image data is output in order.

Figure 13:
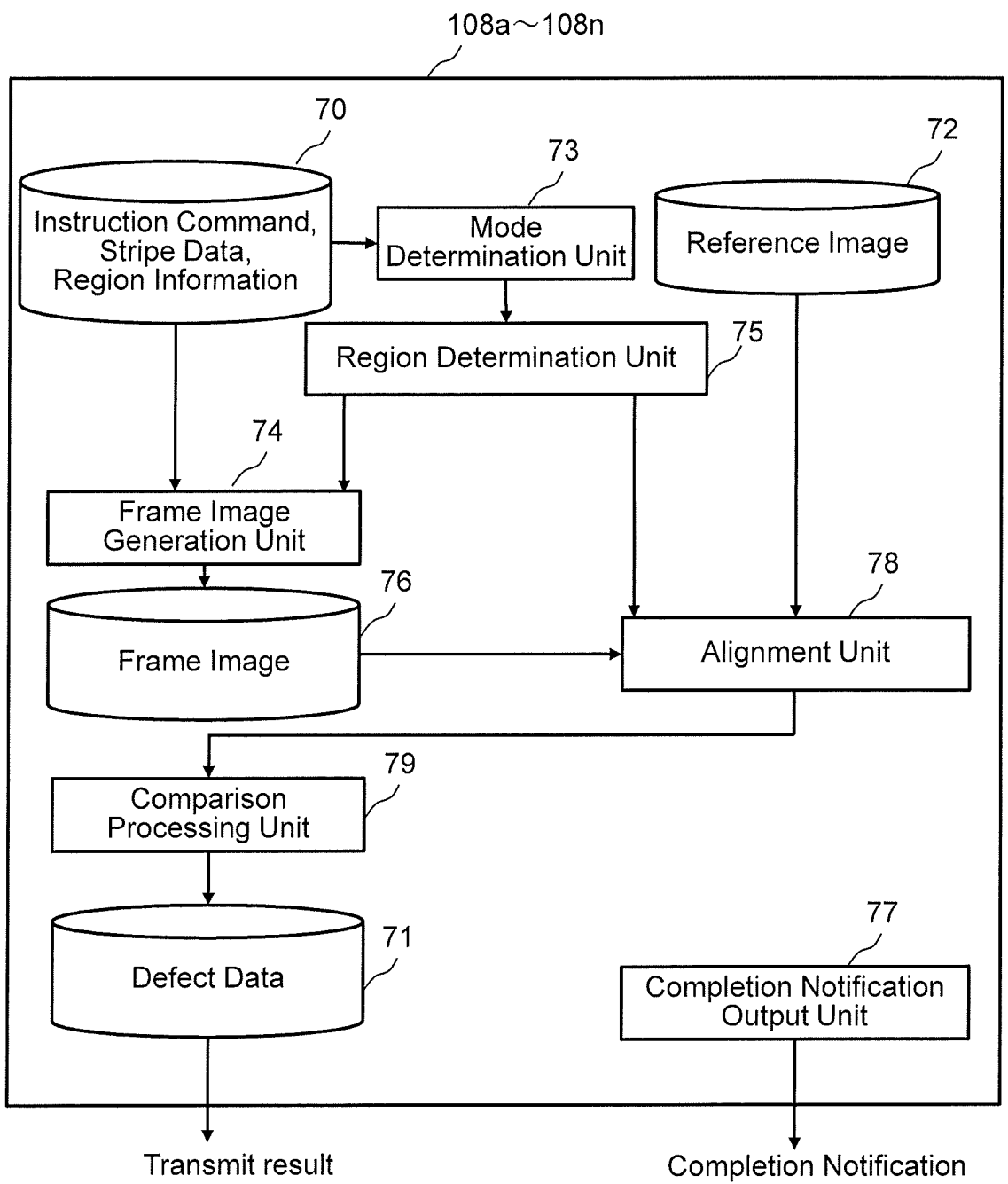
FIG. 13 shows an internal configuration of each comparison circuit according to the first embodiment.

FIG. 13 shows an internal configuration of each comparison circuit according to the first embodiment. In FIG. 13, in each of a plurality of comparison circuits 108a to 108n, there are arranged storage devices 70, 71, 72, and 76, such as magnetic disk drives, a mode determination unit 73, a frame image generation unit 74, a region determination unit 75, a completion notification output unit 77, an alignment unit 78, and a comparison processing unit 79. Each of the "... units" such as the mode determination unit 73, the frame image generation unit 74, the region determination unit 75, the completion notification output unit 77, the alignment unit 78, and the comparison processing unit 79 includes processing circuitry. As the processing circuitry, for example, an electric circuit, computer, processor, circuit board, quantum circuit, or semiconductor device is used. Each "... unit" may use common processing circuitry (the same processing circuitry), or different processing circuitry (separate processing circuitry). Input data needed in the mode determination unit 73, the frame image generation unit 74, the region determination unit 75, the completion notification output unit 77, the alignment unit 78, and the comparison processing unit 79, and calculated results are stored in a memory (not shown) each time.

Stripe data (optical image data), an instruction command, and information on the region to be inspected which are input into each comparison circuit 108 (for example, 108a, 108b, and 108c in the case of three circuits) are individually stored in the storage device 70. Reference image data having been input into each comparison circuit 108 for performing DB inspection, (for example, 108a and 108b in the case of performing DB inspection by two circuits in three circuits) is stored in the storage device 72.

As a plurality of parallel inspection steps (S140a to S140d), each comparison circuit 108 (comparison unit) performs one of the die-to-die (DD) inspection processing which compares optical image data with each other, and the die-to-database (DB) inspection processing which compares optical image data with reference image data generated from design pattern data. Each comparison circuit 108 performs parallel processing. For example, three comparison circuits 108a, 108b, and 108c are assigned to the first inspection stripe 20, and if DD inspection is to be performed by one circuit and DB inspection is to be performed by two circuits, inspection steps (S140a, S140c, and S140D) of three circuits are performed in parallel. The contents of the processing of one comparison circuit performing DD inspection and those of one comparison circuit performing DB inspection in a plurality of comparison circuits 108a to 108n are described below. In the comparison circuits 108a to 108n, the processing contents of each circuit may be the same as those of another circuit which performs the same inspection.

In the mode determining step (S202), for each inspection stripe 20, the mode determination unit 73 reads an instruction command from the storage device 70, and determines whether the inspection mode directed by the instruction command is DD inspection or DB inspection, based on identification information attached to the instruction command.

In the region determining step (S204), for each inspection stripe 20, the region determination unit 75 reads region information from the storage device 70, and determines the region to be inspected in the target inspection stripe 20. As a result of the mode determination, if performing DD inspection, the region determination unit 75 determines the position of the DD region 21b. If performing DB inspection, the region determination unit 75 determines the position of the DB region 21a. For example, when the DB region 21a has further been divided into smaller regions, the region determination unit 75 determines the position of the DB region 21-1a to be inspected, for example.

In the frame image generation step (S206), for each inspection stripe 20, the frame image generation unit 74 reads stripe data from the storage device 70, and generates, with respect to concerning region, the frame image 30 for each frame region shown in FIG. 2. For example, a frame image of 512×512 pixels is generated. A plurality of frame images 30 are generated such that adjacent frame images 30 overlap with each other by a predetermined margin width. By this processing, a plurality of frame images 30 (optical images) corresponding to a plurality of frame regions are acquired. A plurality of frame images 30 are stored in the storage device 76. By what is described above, image (measured image) data of one of two images to be compared for inspection is generated.

In the alignment/positioning step (S208), when the DB inspection is instructed (indicated), the alignment unit 78 reads the frame image 30 (optical image) to be compared from the storage device 76, and the reference image to be compared from the storage device 72. Then, alignment/positioning is performed using a predetermined algorithm. For example, the alignment/positioning is performed using a least-squares method. When the DD inspection is instructed (indicated), the alignment unit 78 reads, from the storage device 76, another frame image 30 (die 2) where the same pattern as the frame image 30 (die 1) to be inspected is arranged. Then, alignment/positioning is performed using a predetermined algorithm. For example, the alignment/positioning is performed using a least-squares method.

In the comparing step (S210), when the DB inspection is instructed (indicated), the comparison processing unit 79 (comparison unit) compares an optical image with a reference image, for each frame region (unit of inspection region). In other words, for each of a plurality of frame regions (small regions), the comparison processing unit 79 compares, for each pixel, the frame image 30 (optical image) of the frame region concerned with the reference image corresponding to the frame image 30 concerned in order to inspect a defect of a pattern. The comparison processing unit 79 compares, for each pixel, the frame image 30 with the reference image based on predetermined determination conditions in order to determine whether there is a defect, such as a shape defect. As the determination conditions, for example, there is used a predetermined algorithm, based on which both the images are compared with each other for each pixel in order to determine whether a defect exists or not. For example, for each pixel, a difference value is calculated by subtracting the pixel value of the frame image 30 from the pixel value of the reference image, and it is determined there is a defect when the difference value is larger than a threshold Th. Then, the comparison result is output to the storage device 71.

When the DD inspection is instructed (indicated), the comparison processing unit 79 (comparison unit) compares optical images with each other, for each combination of the frame image 30 of the die 1 and the frame image 30 of the die 2, where the same patterns are arranged in the dies 1 and 2. In other words, for each combination of corresponding frame regions (small regions) of the dies 1 and 2, the comparison processing unit 79 compares, for each pixel, the frame images 30 (optical images) of the dies 1 and 2 in order to inspect a defect of a pattern. The comparison processing unit 79 compares, for each pixel, both the images based on predetermined determination conditions in order to determine whether there is a defect, such as a shape defect. As the determination conditions, for example, there is used a predetermined algorithm, based on which both the images are compared with each other, for each pixel, in order to determine whether a defect exists or not. For example, for each pixel, a difference value is calculated by subtracting the pixel value of the optical image from the pixel value of the other optical image, and it is determined there is a defect when the difference value is larger than the threshold Th. Then, the comparison result is output to the storage device 71.

As a result of the comparison, data of the frame image 30 including a portion having been determined to be defective is temporarily stored in the storage device 71 as defect image data. For example, coordinate data (defect specifying data) of the position of the defect is temporarily stored in the storage device 71. If there are a plurality of defects, data of the frame image 30 including a defect portion is temporarily stored, for each defect, in the storage device 71 as defect image data. Moreover, similarly, for each defect, coordinate data (defect specifying data) of a defect position is temporarily stored in the storage device 71. These defect image data and defect specifying data are transmitted to the connecting circuit 140. At the time of the transmission, the completion notification output unit 77 outputs a completion notification indicating that processing in the comparison circuit 108 concerned has been completed to the circuit 144. Moreover, after the transmission, each data stored in the storage device 71 is overwritten by the data of the next inspection stripe 20.

Figure 14:
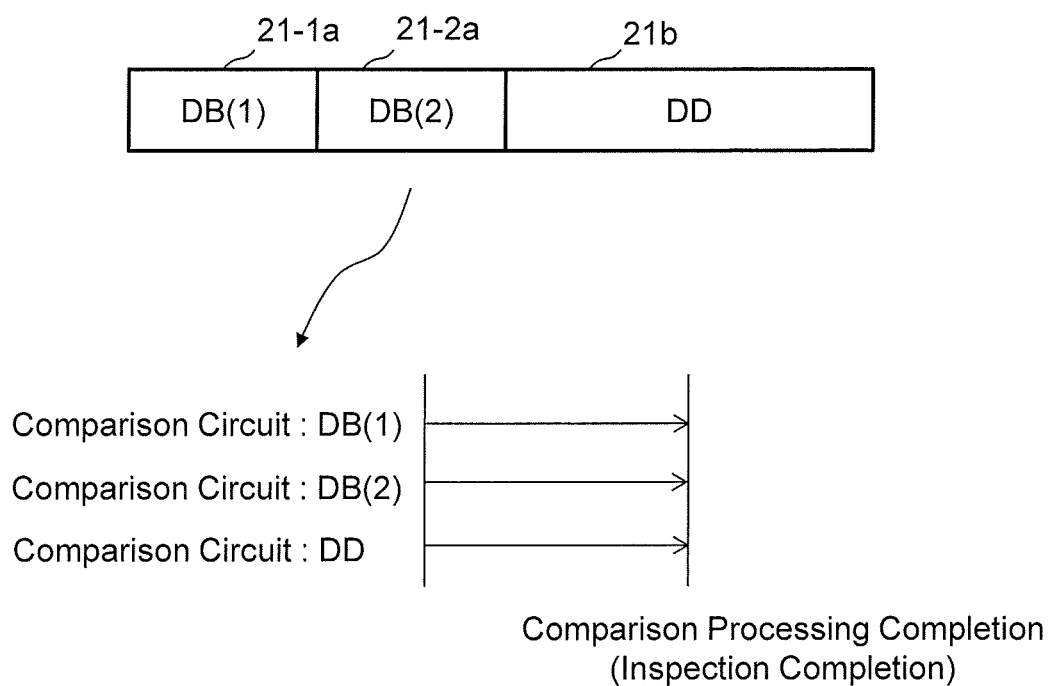
FIG. 14 shows an example of a relation between an assigned region and an inspection time according to the first embodiment.

FIG. 14 shows an example of a relation between an assigned region and an inspection time according to the first embodiment. The example of FIG. 14 shows the case where DB inspection is performed by two comparison circuits and DD inspection is performed by one comparison circuit, namely totally by three comparison circuits. As described above, since the DB region 21a (here, DB region 21-1a and DB region 21-2a) and the DD region 21b are inspected in parallel simultaneously, the inspection time can reduced. Moreover, with respect to the DB region 21a which has a tendency of long inspection time, by further dividing it into smaller regions, it becomes possible to complete the inspection of the DB region 21a at the same time as the inspection of the DD region 21b. Therefore, an efficient inspection can be performed. Furthermore, by making the scanning operation be in a stand-by state until empty comparison circuits whose number is "a" being the determined number of circuits are prepared, it becomes possible to size down the buffer, prevent memory over, and suppress occurrence of a memory swap operation, etc. Therefore, increase of the inspection time due to operation processing delay in the case of occurrence of swap operation etc. can be controlled.

In the connecting step (S160), the connecting circuit 140 receives transmitted data for defect transmission including data on defect image having been determined to be defect as a result of a comparison, and generates defect information, based on the transmitted data. Although one connecting circuit 140 is shown in the example of FIG. 1, it is not limited thereto. At least one connecting circuit 140 should just be arranged. The connecting circuit 140 determines superimposed (overlapped) defect image data, based on the transmitted coordinate data. If there is a plurality of superimposed defect image data (frame image 30), the connecting circuit 140 generates, for each defect, defect information in which one defect image data and defect coordinates are combined. As the defect information, an image is generated where defect coordinates are superimposed on a defect coordinate position in the defect image data, for example. If a plurality of defects exist in the same defect image data, it is also preferable to generate an image where a plurality of defect coordinates are superimposed on one defect image data (frame image 30). The generated defect information may be output to the magnetic disk drive 109, the magnetic tape drive 115, the flexible disk device (FD) 116, the CRT 117, or the pattern monitor 118, or alternatively, output from the printer 119.

As described above, according to the first embodiment, it is possible to perform both the die-to-die inspection and the die-to-database inspection by one scanning. Therefore, even if a region to be inspected by the die-to-die method and a region to be inspected by the die-to-database method are intermingled, inspection processing can be performed efficiently.

Embodiments have been explained referring to specific examples described above. However, the present invention is not limited to these specific examples. For example, in Embodiments, although a transmitted illumination optical system using a transmitted light is described as the illumination optical system 170, it is not limited thereto. For example, a reflected illumination optical system using a reflected light may also be used. Alternatively, a transmitted light and a reflected light may be used simultaneously by way of combining a transmitted illumination optical system and a reflection illumination optical system. Moreover, the light source 103 is not limited to the light source of ultraviolet ray (light), and an emission source of electron beams may also be used.

While the apparatus configuration, control method, and the like not directly necessary for explaining the present invention are not described, some or all of them can be appropriately selected and used on a case-by-case basis when needed. For example, although description of the configuration of the control unit for controlling the inspection apparatus 100 is omitted, it should be understood that some or all of the configuration of the control unit can be selected and used appropriately when necessary.

In addition, any other pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
   an optical image acquisition mechanism configured to acquire optical image data of a plurality of regions from a substrate where a plurality of figure patterns are formed;
   a plurality of comparison circuits each configured to perform one of die-to-die inspection processing which compares the optical image data with each other and die-to-database inspection processing which compares the optical image data with reference image data generated from design pattern data, the plurality of comparison circuits being capable of parallel processing; and
   an inspection circuit configured, for each region of the plurality of regions, to individually output the optical image data of a region concerned to comparison circuits, a number of the comparison circuits variably set for the each region, in the plurality of comparison circuits, and to control each comparison circuit, serving as an output destination of the optical image data in the plurality of comparison circuits, to perform one of the die-to-die inspection processing and the die-to-database inspection processing.

2. The apparatus according to claim 1, further comprising:
   an area ratio calculation circuit configured to calculate, for the each region, an area ratio between a region portion to perform the die-to-die inspection processing and a region portion to perform the die-to-database inspection processing in the region concerned,
   wherein the inspection circuit variably controls, based on the area ratio, a number of the comparison circuits for performing the die-to-die inspection processing and a number of the comparison circuits for performing the die-to-database inspection processing which serve as output destinations of the optical image data.

3. The apparatus according to claim 2, further comprising:
   a region dividing circuit configured to divide, for the each region, based on the area ratio, a region portion which takes a longer inspection processing time in the region portion to perform the die-to-die inspection processing and the region portion to perform the die-to-database inspection processing into a plurality of small regions.

4. The apparatus according to claim 2, further comprising:
   a determination circuit configured to variably determine, for the each region, based on the area ratio, a number of the comparison circuits for performing the die-to-die inspection processing and a number of the comparison circuits for performing the die-to-database inspection processing.

5. The apparatus according to claim 4, further comprising:
   a data volume calculation circuit configured to calculate, for the each region, a data volume of design pattern data of the region concerned, and
   a data volume ratio calculation circuit configured to calculate, for the each region, a data volume ratio between the data volume and a data volume threshold,
   wherein the determination circuit determines the number of the comparison circuits for performing the die-to-database inspection processing based on the data volume ratio to be greater than the number of them based on the area ratio.

6. The apparatus according to claim 4, further comprising:
a degree-of-difficulty calculation circuit configured to calculate, for the each region, a degree of difficulty in generating a reference image of the region concerned, based on design pattern data of the region concerned, and
a degree-of-difficulty ratio calculation circuit configured to calculate, for the each region, a degree-of-difficulty ratio between the degree of difficulty and a threshold of a degree of difficulty,
wherein the determination circuit determines the number of the comparison circuits for performing the die-to-database inspection processing based on the degree-of-difficulty ratio to be greater than the number of them based on the area ratio.

7. The apparatus according to claim 1, further comprising:
a data volume calculation circuit configured to calculate, for the each region, a data volume of design pattern data of the region concerned, and
a data volume ratio calculation circuit configured to calculate, for the each region, a data volume ratio between the data volume and a data volume threshold,
wherein the inspection circuit variably controls, for the each region, based on the data volume ratio, a number of the comparison circuits for performing the die-to-database inspection processing.

8. The apparatus according to claim 1, further comprising:
a degree-of-difficulty calculation circuit configured to calculate, for the each region, a degree of difficulty in generating a reference image of the region concerned, based on design pattern data of the region concerned, and
a degree-of-difficulty ratio calculation circuit configured to calculate, for the each region, a degree-of-difficulty ratio between the degree of difficulty and a threshold of a degree of difficulty,
wherein the inspection circuit variably controls, for the each region, based on the degree-of-difficulty ratio, a number of the comparison circuits for performing the die-to-database inspection processing.

9. The apparatus according to claim 1, further comprising:
a region determination circuit configured to determine, for the each region, a region portion to perform the die-to-die inspection processing and a region portion to perform the die-to-database inspection processing, in the region concerned.

10. A pattern inspection method comprising:
acquiring optical image data of a plurality of regions from a substrate where a plurality of figure patterns are formed;
outputting, for each region of the plurality of regions, the optical image data of a region concerned to comparison circuits, a number of the comparison circuits variably set for the each region, in a plurality of comparison circuits each of which performs one of die-to-die inspection processing that compares the optical image data with each other and die-to-database inspection processing that compares the optical image data with reference image data generated from design pattern data, the plurality of comparison circuits being capable of parallel processing; and
performing one of the die-to-die inspection processing and the die-to-database inspection processing for the optical image data of the region concerned by each comparison circuit serving as an output destination of the optical image data in the plurality of comparison circuits, and outputting an inspection result.

* * * * *